US011151496B2

(12) United States Patent
Mahajan et al.

(10) Patent No.: US 11,151,496 B2
(45) Date of Patent: Oct. 19, 2021

(54) PARALLEL LEAD TIME DETERMINATIONS IN SUPPLY CHAIN ARCHITECTURE

(71) Applicant: Target Brands, Inc., Minneapolis, MN (US)

(72) Inventors: Gagan Mahajan, Lakeville, MN (US); Praveen Kumar Kumaresen, Minnetonka, MN (US); Abhilash Koneri, Minneapolis, MN (US); Kraig Narr, Stillwater, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 160 days.

(21) Appl. No.: 16/150,999

(22) Filed: Oct. 3, 2018

(65) Prior Publication Data

US 2019/0258978 A1  Aug. 22, 2019

Related U.S. Application Data

(60) Provisional application No. 62/632,108, filed on Feb. 19, 2018.

(51) Int. Cl.
*G06Q 10/06* (2012.01)
*G06Q 10/04* (2012.01)
(Continued)

(52) U.S. Cl.
CPC ....... *G06Q 10/06315* (2013.01); *G06N 5/046* (2013.01); *G06N 20/00* (2019.01);
(Continued)

(58) Field of Classification Search
None
See application file for complete search history.

(56) References Cited

U.S. PATENT DOCUMENTS 6,889,197 B2    5/2005  Lidow
8,688,540 B1 *  4/2014  Patel .................. G06Q 20/0855
                                          705/26.3
(Continued)

FOREIGN PATENT DOCUMENTS

WO    2004044807 A1    5/2004
WO    2005/062771 A2   7/2005

OTHER PUBLICATIONS

International Preliminary Report on Patentability issued in related International Patent Application No. PCT/US2019/018601; dated Aug. 27, 2020, 7 Pages.

(Continued)

*Primary Examiner* — Sujay Koneru
(74) *Attorney, Agent, or Firm* — Merchant & Gould P.C.

(57) ABSTRACT

A lead time calculation system includes a configured lead time generator and a measured lead time generator. The configured lead time generator calculates a lead time estimate to move products between a first node in a supply chain and a second node in the supply chain based on expected travel times, expected warehouse times, expected sourcing times, delivery schedules, unloading schedules, and product-node relationship data. A measured lead time generator receives electronic data interchange (EDI) events, receipts, and purchase order data and calculates an actual lead time for the first node and second node. The actual lead time can be compared with the configured lead time to evaluate performance of different aspects of the supply chain. Lead time estimates can be adjusted based on actual lead times that are measured by the measured lead time generator.

19 Claims, 13 Drawing Sheets

(51) Int. Cl.
  *G06Q 10/08* (2012.01)
  *G06N 20/00* (2019.01)
  *G06N 5/04* (2006.01)

(52) U.S. Cl.
  CPC ....... *G06Q 10/04* (2013.01); *G06Q 10/06312* (2013.01); *G06Q 10/08* (2013.01); *G06Q 10/083* (2013.01); *G06Q 10/087* (2013.01); *G06Q 10/08355* (2013.01)

(56) References Cited

U.S. PATENT DOCUMENTS

| | | | |
|---|---|---|---|
| 9,195,959 B1 | 11/2015 | Lopez et al. | |
| 9,466,045 B1 | 10/2016 | Kumar | |
| 10,163,070 B1* | 12/2018 | Phillips | G06Q 10/083 |
| 2003/0093388 A1 | 5/2003 | Albright | |
| 2003/0227392 A1* | 12/2003 | Ebert | H04L 67/12 340/8.1 |
| 2004/0172321 A1* | 9/2004 | Vemula | G06Q 10/06 705/7.24 |
| 2004/0225507 A1 | 11/2004 | Smith et al. | |
| 2004/0243452 A1* | 12/2004 | Barton | G06Q 10/083 705/337 |
| 2005/0075949 A1* | 4/2005 | Uhrig | G06Q 10/087 705/28 |
| 2005/0165629 A1 | 7/2005 | Bruns | |
| 2005/0177435 A1 | 11/2005 | Lidow | |
| 2006/0041463 A1* | 2/2006 | Yoshida | G06Q 10/087 705/7.31 |
| 2006/0100729 A1* | 5/2006 | Daferner | G06Q 10/04 700/100 |
| 2006/0235557 A1* | 10/2006 | Knight | G06Q 10/087 700/103 |
| 2006/0241822 A1* | 10/2006 | Yadappanavar | G06Q 10/06312 701/5 |
| 2006/0277086 A1* | 12/2006 | Ball | G06Q 10/087 705/7.25 |
| 2006/0282346 A1* | 12/2006 | Kernodle | G06Q 10/06375 705/28 |
| 2007/0270990 A1* | 11/2007 | Katircioglu | G06Q 10/06 700/99 |
| 2007/0271152 A1* | 11/2007 | Vo | G06Q 30/0601 705/26.1 |
| 2010/0312593 A1* | 12/2010 | Johnston | G06Q 40/02 705/7.34 |
| 2010/0312715 A1* | 12/2010 | Esque | G06Q 50/32 705/330 |
| 2012/0226625 A1* | 9/2012 | Pfeffer | G06Q 50/28 705/341 |
| 2013/0151434 A1* | 6/2013 | Chandaria | G06Q 10/0832 705/333 |
| 2014/0330741 A1* | 11/2014 | Bialynicka-Birula | G06Q 10/0838 705/341 |
| 2016/0071033 A1* | 3/2016 | Davis | G06Q 10/0631 705/7.15 |
| 2016/0078523 A1 | 3/2016 | Lopez et al. | |
| 2016/0217399 A1 | 7/2016 | Roelofs et al. | |
| 2016/0217406 A1 | 7/2016 | Najmi | |
| 2017/0154347 A1* | 6/2017 | Bateman | G06Q 40/08 |
| 2017/0255903 A1* | 9/2017 | Chowdhry | G06Q 10/0833 |
| 2017/0287086 A1* | 10/2017 | Lopez | G06Q 50/12 |
| 2017/0323250 A1* | 11/2017 | Lindbo | G06Q 30/0621 |
| 2018/0158020 A1* | 6/2018 | Khasis | G01C 21/3453 |
| 2018/0218321 A1* | 8/2018 | Cramer | G06Q 10/0834 |
| 2019/0073611 A1* | 3/2019 | Sahota | G06Q 10/08 |
| 2019/0130260 A1* | 5/2019 | Han | G06F 16/487 |
| 2019/0202133 A1* | 7/2019 | Jacobs, II | B29C 64/393 |
| 2019/0236740 A1* | 8/2019 | Rao | G06Q 10/067 |
| 2019/0258978 A1* | 8/2019 | Mahajan | G06Q 10/04 |
| 2019/0266557 A1* | 8/2019 | Berk | G06Q 10/0832 |
| 2019/0318298 A1* | 10/2019 | Driegert | G06Q 10/083 |

OTHER PUBLICATIONS

International Preliminary Report on Patentability issued in related International Patent Application No. PCT/US2019/018595; dated Aug. 27, 2020, 7 Pages.

International Search Report and Written Opinion in PCT/US2019/018595 dated Apr. 9, 2019, 16 pages.

International Search Report and Written Opinion in PCT/US2019/018601 dated Feb. 19, 2019, 16 pages.

* cited by examiner

FIG. 8

| Purchase Order ID | Source Node | Destination Node | Configured Lead Time (h) | Measured Lead Time (h) | Over/Under |
|---|---|---|---|---|---|
| 7413125 | 8915 | 1168 | 25.5 | 24.8 | 0.7 |
| 8347006 | 3684 | 9088 | 20.4 | 22.8 | -2.4 |
| 2172789 | 2895 | 3004 | 19.8 | 19.5 | 0.3 |
| 8560885 | 3658 | 1568 | 5.6 | 6.1 | -0.5 |
| 6272352 | 2013 | 3052 | 38.8 | 55.9 | -17.1 |
| 3244495 | 9084 | 6980 | 48.1 | 40.1 | 8 |

750, 752, 754, 756, 758, 760, 762

Lead Time Estimator

Enter Node IDs

Source Node
Destination Node  } 804

Enter Ship Begin Date or Ship End Date

Ship Begin
Ship End  } 808

Calculate — 810

Lead Time Estimator

Source Node: 551
Destination Node: 1375
Ship Begin: 7/15/18  } 814

Shipping Method    Arrival Date
Ground UPS              7/20/18
Ground Express          7/17/18
Air Overnight           7/16/18  } 818

Expedite

Purchase Order: 59842

○ Express Ground  +$12  9/23/18 20:00
○ Air Express  +$26  9/21/18 14:00

[ Issue Expedited Routing Request ]

[ Cancel ]

PARALLEL LEAD TIME DETERMINATIONS IN SUPPLY CHAIN ARCHITECTURE

TECHNICAL FIELD

The present disclosure is directed to methods and systems for estimating lead time. More particularly, the present disclosure describes a system architecture for comparing projected sourcing lead times and node-to-node product transfer lead times in a supply chain architecture with actual lead times.

CROSS-REFERENCE TO RELATED APPLICATIONS

This application claims the benefit of U.S. Provisional Application No. 62/632,108 filed Feb. 19, 2018. This application is related by subject matter to co-pending U.S. application Ser. No. 16/150,935, filed Oct. 3, 2018.

BACKGROUND

Accurate lead times are an important factor in supply chain management. Whether it be a sourcing lead time (e.g., the amount time from receipt of a purchase order to receipt of the ordered product at a receiving node within the supply chain) or an inventory movement lead time (e.g., the amount of time to move product inventory between two or more nodes in a supply chain), an incorrectly estimated lead time can result in lost sales opportunities and a supply chain bloated with unmovable inventory. However, an accurately estimated lead time can result in a lean and agile inventory supply with optimal sales.

Existing attempts to calculate lead times for various sourcing events generally accommodate inputs from product sources, and calculate sourcing lead times for particular product fulfillment routes. However, such existing systems are ill-equipped to be incorporated into a real-time supply chain management system due at least in part to a lack of integration of such lead time calculations with the supply chain management system, and lack of concurrent coordination with demand forecasting and replenishment aspects of the supply chain management system.

SUMMARY

In general terms, the present disclosure relates to a lead time architecture useful in generating accurate lead time estimates for supply chain management.

The calculators utilize expected values to predict the timing of each step of the transport process. These expected values are based on achievable timelines and can be informed by historical timing of the transport process. The expected, or configured, lead times can be compared to actual lead times for the same transport process. This allows for evaluation of the suppliers, carriers, and other aspects of the supply chain to determine if adjustments need to be made. In some instances, this comparison can expose weak links in the supply chain so that they can be addressed with improvements.

According to the present disclosure, a lead time calculation system includes a configured lead time generator usable to estimate lead times for transporting product from a source node to a destination node within a supply chain. The system includes a configured lead time generator configured to: receive input of a source node and a destination node; receive an expected route travel time calculation, the calculation being based on a zip code of the source node and a zip code of the destination node; receive a delivery schedule, the delivery schedule indicating the time of day that a product transport vehicle is scheduled to move product from the source node to the destination node; receive an unloading schedule, the unloading schedule indicating the time of day that the product transport vehicle is scheduled to be at the second node for the unloading of transported product; receive an expected warehousing time calculation, the warehousing time calculation reflecting the projected amount of time spent in moving product out of the source node and the amount of time spent in moving the transported product into the destination node; receive product-node relationship data that identifies which products are located at the first node; and calculate a configured lead time estimate for moving product from the source node in the supply chain to the destination node in the supply chain based on the expected route travel time calculation, the received delivery schedule, the received unloading schedule, the received expected warehousing time, and the received product-node relationship data. The system further includes a measured lead time generator configured to: receive input of a source node and a destination node; receive electronic event log streams; extract one or more of electronic data interchange (EDI) events, receipts, and purchase order data from the event log streams; and calculate an actual lead time for moving product from the source node in the supply chain to the destination node in the supply chain based on the EDI events, receipts, and purchase order data. The system also includes a lead time application programming interface (API) configured to: receive a request for a lead time calculation comprising at least a source node and a destination node; and output the actual lead time and configured lead time to an inventory management system.

At least one aspect of the present disclosure is directed to a computer-implemented method of an estimated lead time between a source node and a destination node of a supply chain, the method comprising: receiving input of the source node and the destination node; receiving expected travel times, expected sourcing times, and expected warehouse times; receiving delivery schedules, unloading schedules, and product-node relationships; calculating a configured lead time for transporting products from the source node to the destination node; submitting a purchase order request to transport products from the source node to the destination node; receiving EDI events, receipts, and purchase order data for the purchase order; calculating an actual lead time for transporting products from the source node to the destination node; and comparing the actual lead time to the configured lead time.

A further aspect of the present disclosure includes a computer implemented method of generating and evaluating lead times for movement of one or more items from a first node to a second node, the method comprising: presenting a user interface on a display of a computing device, the user interface comprising: a source node field, a destination node field, a ship begin date field, and a ship end date field; and receiving input of a source node, a destination node, and at least one of a ship begin date and a ship end date; calculating an expected lead time for at least one lead time option, the lead time option have a shipping method and rate; presenting the at least one lead time option on the user interface; receiving an input of a selection of a lead time option; communicating a purchase order request to an inventory management system, the purchase order request including at least the source node, destination node, and at least one of ship begin date and ship end date; calculating an actual lead time for transporting products from the source node to the destination node to complete the purchase order; and presenting the actual lead time and the configured lead time on the user interface.

BRIEF DESCRIPTION OF THE DRAWINGS

FIG. 8 is an example table of lead time calculations.

FIG. 9A is an example lead time user interface displaying fields for user input.

FIG. 9B is an example lead time user interface displaying summaries of lead time options.

FIG. 13 is another view of the expediting user interface displaying transport options.

DETAILED DESCRIPTION

Figure 1:
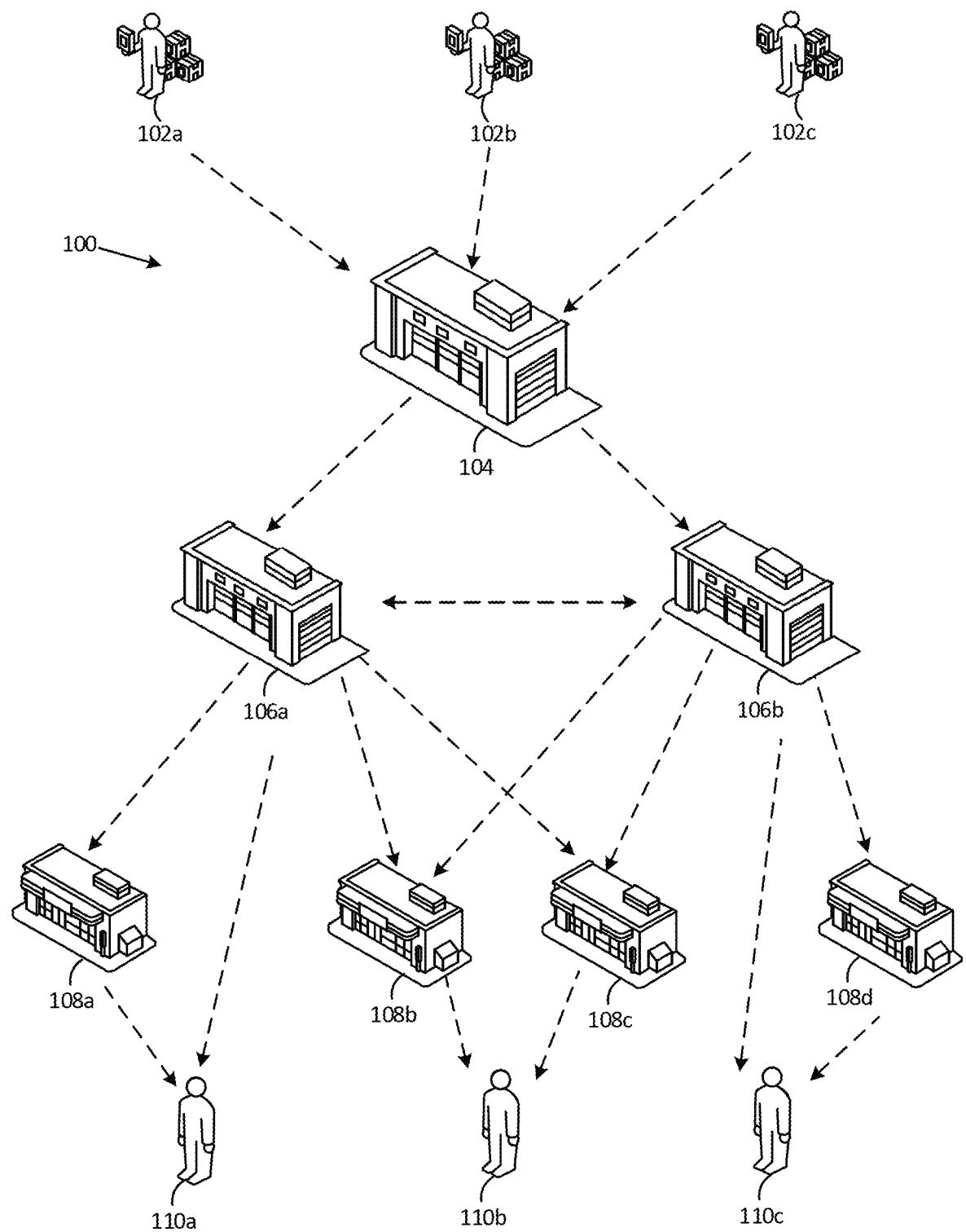
FIG. 1 illustrates a schematic diagram of an example supply chain for a retail enterprise.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

Retailers and e-retailers have a continuing motivation to place the right type and quantity of products at the right location at the right time and price to achieve optimal sales. At least one factor to consider in achieving optimal sales through supply chain management is the lead time required to move product inventory through a supply chain to a final retail or e-retail destination. The methods and systems described herein provide a lead time architecture to calculate reliably accurate lead time estimates that can be used as a factor in supply chain management.

The lead time calculations of the present disclosure have a number of applications within the supply chain management system described herein. For example, the lead time calculations described herein can be used to calculate various alternative options for fulfillment scenarios in association with costs for such scenarios, thereby allowing an enterprise to readily determine order fulfillment scenarios for various customers, while having an accurate, current view of inventory and lead times for providing that inventory to customers. The lead time calculations can further be utilized to compare actual lead times with those that are estimated to evaluate performance and the estimating process itself.

Lead time estimates are based on historical data. Events from purchase orders and receipts are ingested into event processor containers and are then stored in a sink. Lead time calculators then use actual data regarding the times it takes for items to be prepared for shipments and then travel from one node to another. This data is combined with estimates that are computer or human driven for how long it should take for an item to travel from one node to another. By incorporating projected estimates into the calculation, weak or slow nodes or shipping routes can be identified and improved.

FIG. 1 illustrates a schematic diagram 100 of an example supply chain for a retail enterprise. This is just one example of a supply chain in which the present systems and methods can operate. The diagram 100 illustrates the flow of inventory from vendor 102 to customer 110. The inventory moves through various nodes to arrive at the customer. In this example, the nodes include a receive center 104, two flow centers 106a, 106b, four retail stores 108a, 108b, 108c, 108d, and three customer residences 110a, 110b, 110c. In practice, the supply chain could include many more nodes in different proportions. In some embodiments, there are not separate receive centers and flow centers. Instead, there may be one type of warehouse or distribution center for holding inventory before distributing to stores and customers.

Arrows in the diagram indicate movement of inventory. Inventory will typically flow downward through the supply chain, but in some instances inventory may move between flow centers 106 or between retail stores 108. In some embodiments, inventory may even move from a flow center 106 to a receive center 104 or from a retail store 108 to a flow center 106.

Vendors 102 produce/provide the items or products that will be sold by the retail entity. A purchase order is typically placed to request products from a vendor. In some instances, the vendor 102 will transport the ordered products to a receive center 104. In other instances, the retail entity arranges for the products to be picked up from the vendor 102 and transported to the receive center 104. Once at the receive center 104, the products are prepared for transportation to one or more flow centers. The products may arrive from the vendors in large groupings that need to be broken down into individual units for distribution to flow centers 106 and/or stores 108. Accordingly, once received into the supply chain of the enterprise, each individual unit can be tracked and shipped among the various nodes of the supply chain (receive centers 104, flow centers 106, and stores 108).

A variety of products are prepared for shipment to one or more flow centers 106. The flow centers 106 are typically positioned to enable quick shipment to one or more retail stores 108. Each flow center 106 may supply inventory to multiple retail stores 108. In some instances, more than one flow center 106 will send inventory to a retail store 108. For example, in FIG. 1, flow center 106a distributes inventory to stores 108a, 108b, and 108c. Flow center 106b distributes to stores 108b, 108c, and 108d. In some instances, to the extent products received at a flow center 106 are not already broken down into individual units, the products may be broken down into individual units in order to distribute individual items to stores 108, or optionally to fill online orders that will be delivered directly to customers from the flow center 106 or store 108. In the example of FIG. 1, products are shipped directly from flow center 106a to a customer 110a and from flow center 106b to customer 110c.

Once products arrive at the retail stores 108, they are either stored in a back room or displayed on shelves. This inventory is available for in-store purchases, pick-up orders, or local delivery. Depending on the location of a customer ordering products online, the shipments of products could come from one or more retail stores 108, or flow centers 106. For instance, customer 110b could receive shipments of products from either store 108b or store 108c, or both (in the instance of a multi-item purchase).

It is noted that, between receive centers 108, flow centers 106, and stores 108, there may be preexisting, predetermined delivery routes established. For example, there may be daily or weekly transit routes between a receive center and one or more flow centers. The receive center can provide to the flow centers the selection of individual items that are needed by stores 108 serviced by the one or more flow centers proximate to and/or servicing those stores. The flow centers can also have daily or other periodic transportation routes established to stores that are serviced, thereby ensuring prompt replenishment of items at stores in response to item sales.

In addition, the predetermined delivery routes can be used for various purposes. For example, in some situations, the predetermined delivery routes can be used to deliver products in various forms. As explained in further detail below, items distributed via the supply chain are tracked on an individual (per-item) basis; as such, items can be delivered to stores 108 in any convenient manner. In some example embodiments, items are tracked on an individual basis, but may be grouped at a flow center 106 to simplify restocking of the store 108, for example by placing together in a package a collection of individual items of different types but which may easily be stocked conveniently once those items arrive at a store 108. For example, goods that are located in a common department, row, or shelf of a store can be grouped and packed together at the flow center 106.

Once those items reach the store 108, a restocking operation can restock each of the items in that shelf, row, or department easily. Still further, because items are packed and tracked on an individual basis at the flow center and sent to stores based, at least in part, on demand signals received from stores, the item collections are based on the number of items sold and therefore the restocking operation can provide a package of items that will fit on store shelves, rather than requiring additional backroom stocking and storage.

In the context of the present disclosure, a supply chain management system is provided that assists in coordination of product shipments among nodes of the supply chain, and uses inventory models to automatically rebalance inventory within the supply chain of the enterprise to ensure predicted and actual item demand from customers of the enterprise is fulfilled to a predetermined threshold success rate. The supply chain management system allows for balancing of items across the supply chain based on inventory and demand models, as well as real time demand signals, and performs automated generation of purchase and transfer orders throughout the supply chain based on such demand and lead time calculations between paints both within and external to the supply chain. Accordingly, as noted below, substantial advantages are realized using the methods and systems of the present disclosure.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders. In other embodiments, the systems and methods could operate for distribution channels that distribute supplies to multiple locations within a business rather than selling to individual customers. Regardless of the application, the systems and methods described herein are most beneficial when used to manage a supply chain for a plurality of nodes with the goal of increasing efficiency of inventory movement by responding to both proactive and reactive demand signals in real time.

Figure 2:
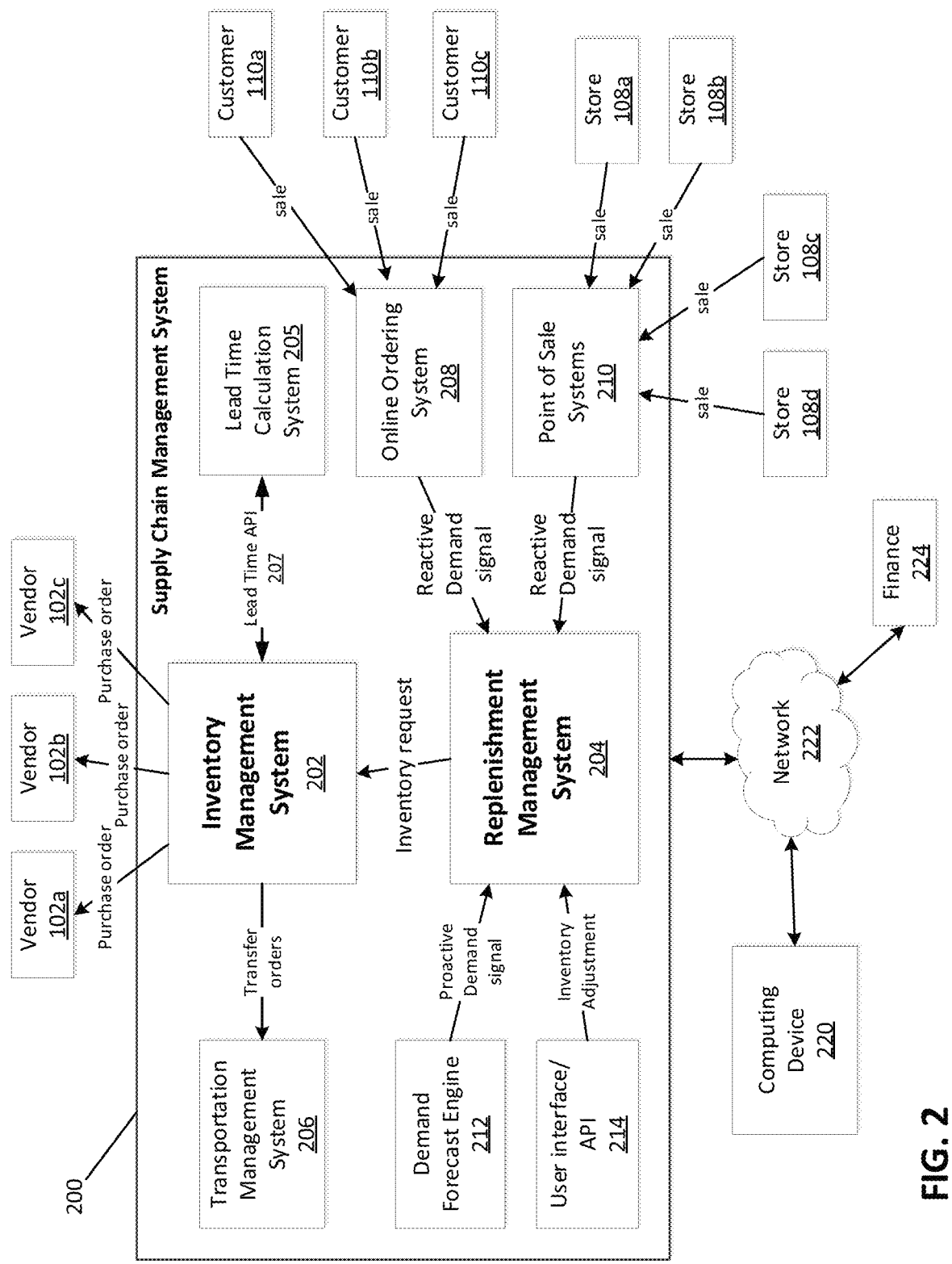
FIG. 2 illustrates a schematic diagram of an example supply chain management system.

FIG. 2 illustrates a schematic diagram of an example system 200 for managing a supply chain. Components of the supply chain management system 200 include an inventory management system 202 and a replenishment management system 204. Together, the inventory management system 202 and replenishment management system 204 operate to monitor inventory levels across all nodes of a supply chain, determine if and when adjustments to inventory levels need to be made, and facilitate transport of inventory between nodes to respond to customer demand.

The inventory management system 202 receives inventory requests from the replenishment management system 204. In response to the inventory requests, the inventory management system 202 determines whether additional inventory is needed at one or more nodes within the supply chain to satisfy the request. Additional inventory may be transported to one node from another node if sufficient stock of the needed product(s) is available within the required timeframe within the supply chain. In such instances, transfer orders are issued to the transportation management system 206. If the inventory management system 202 determines that there is not sufficient stock of the requested products at another node or that transporting the products within the supply chain would be too costly or time consuming, additional stock is ordered from one or more vendors 102 through purchase orders issued from the inventory management system 202.

The inventory management system 202 also communicates with the user interface/API 214 to receive lead time requests and generate lead time calculations for display on the user interface 214.

In particular, and in the embodiment shown, the supply chain management system 200 includes a lead time calculation system 205 that is operatively connected to the inventory management system 200. The lead time calculation system 205 is described in further detail below in connection with FIG. 3; in general the lead time calculation system 205 publishes a lead time API 207 which can be queried by the inventory management system. The query provided to the lead time API 207 can include, for example, a starting point (e.g., a vendor, a receive center, a flow center, or a store) acting as a source of an item, and an end point (e.g., a receive center, flow center, store, or intended customer) for the item. The query can also include various additional parameters, for example restrictions regarding cost, prioritization (e.g., preferred or maximum lead time required for fulfillment), or shipping routes (e.g., air, land, vehicle type and class of shipment, etc.). In response, the lead time calculation system 205 generally can use aggregated transportation information and fulfillment timings (e.g., time to fulfillment of orders on a per-item or per-vendor basis) to determine a total lead time for fulfillment or replenishment of an item, or simply of movement of the item from point to point.

In the embodiment shown, the replenishment management system 204 receives demand signals from one or more sources including an online ordering system 208, one or more point of sale systems 210, and a demand forecast engine 212. The demand signals can be proactive or reactive. Proactive demand signals are received from the demand forecast engine 212 and are generated by predicting expected customer demand for individual products on a day by day basis. Reactive demand signals are received from the point of sale system 210 (e.g., a point of sale network distributed across stores 108 within the enterprise) or through the online ordering system 208. The online ordering system 208 receives orders from customers 110 and coordinates fulfillment of those orders. The point of sale systems 210 record sales that are made at stores 108. The replenishment management system 204 also receives inventory adjustments from the user interface 214. Inventory adjustments are instructions received from a user to modify inventory levels at one or more locations or nodes within the supply chain. Inventory adjustments may be made for reasons other than expected or actual customer demand for particular items.

In some embodiments the supply chain management system 200 communicates with a computing device 220 through a network 222. The network 222 can be any of a variety of types of public or private communications networks, such as the Internet. The computing device 220 can be any network-connected device including desktop computers, laptop computers, tablet computing devices, smartphones, and other devices capable of connecting to the Internet through wireless or wired connections. In some instances, the supply chain management system 200 also communicates with a finance system 224 through the network 222.

Figure 3:
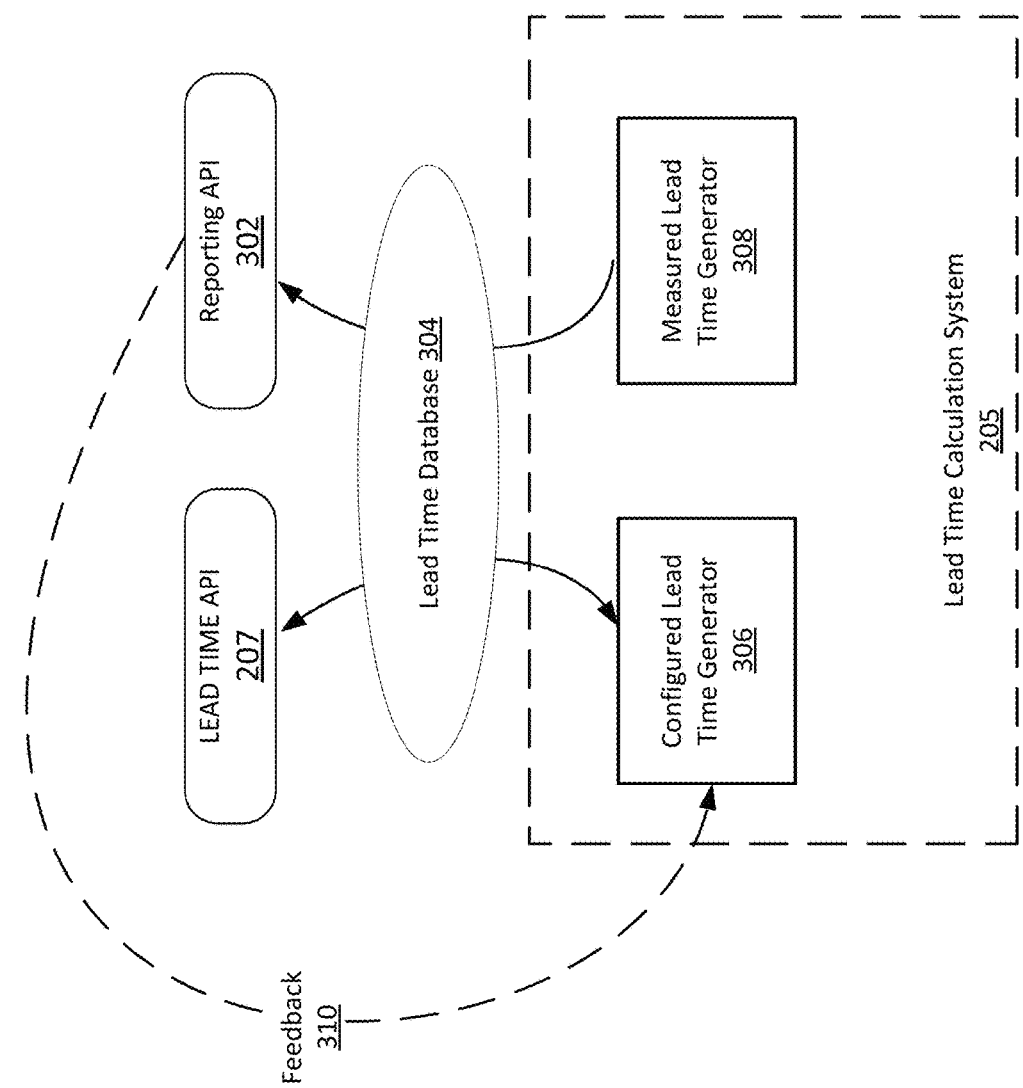
FIG. 3 illustrates a schematic diagram of a lead time calculation system of FIG. 2.

FIG. 3 illustrates a schematic diagram of an example lead time calculation system 205. The lead time calculation system 205 includes a configured lead time generator 306 and a measured lead time generator 308. The configured lead time generator 306 operates to estimate lead times for transporting products from a source node to a destination node in fulfillment of a purchase order based on the amount of time expected to complete the transport process. The projected lead times can be based on estimates calculated by machine learning or input from a human user through a user interface. The configured lead time generator 306 relies in part upon feedback 310 received from a reporting API 302 based on measured lead times. The feedback 310 can be used to inform humans or machines that evaluate estimated lead times and goal lead times. The configured lead time generator 306 is in communication with the lead time API 207 and a lead time database 304.

The configured lead time generator 306 relies in part upon feedback 310 received from a reporting API 302 based on measured lead times. Future lead time calculations can be based on historical lead times, but are not simply an average of the historical lead times. The feedback 310 can be used by humans or machines to adjust settings for the configured lead time generator 306 in response to outliers. The feedback 310 could be used to train a model or artificial intelligence engine for the purpose of updating one or more settings or inputs for the configured lead time generator 306. The machine learning or artificial intelligence engine could take into account various factors that could affect lead times such as bad weather, equipment malfunctions, and other issues that could have caused a particular historical lead time to be an outlier. In some embodiments, the feedback is reviewed and analyzed by human users.

Adjusting parameters for the configured lead time generator in response to feedback 310 is beneficial for at least two reasons. First, it allows for lead times to be calculated based on what is expected and reasonable for the supply chain given the parameters of a request rather than allowing outliers to affect the calculations. Second, it enables computing devices or humans to analyze trends in actual lead times to determine whether a particular node is having a problem that needs to be addressed.

The measured lead time generator 308 operates to measure actual lead times for a given purchase order. The time it takes to transport the ordered products from the source node to the destination node are recorded based on received events. The measured lead time generator 308 is in communication with a reporting API 302. In some embodiments, the reporting API 302 may be the user interface/API 214 of FIG. 2. The measured lead time generator 308 can also save lead times to the lead time database 304.

The lead time database 304 records estimated and calculated lead times for later use. The lead time database 304 can be queried by the lead time API 207 or the reporting API 302.

Figure 4:
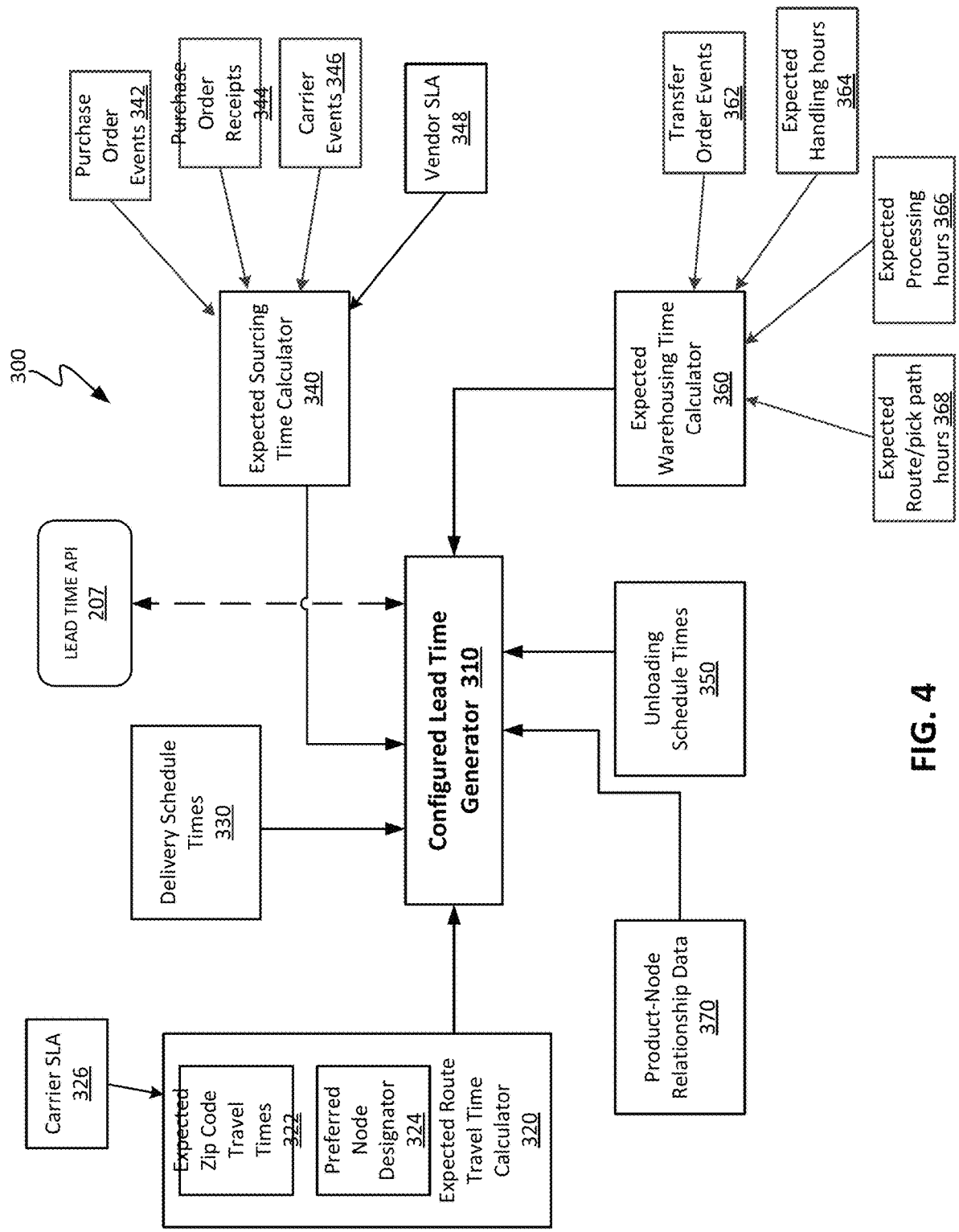
FIG. 4 illustrates a detailed schematic diagram of the configured lead time generator of FIG. 3.

FIG. 4 illustrates a detailed schematic diagram of the configured lead time generator 310. The configured lead time generator 310 relies upon a number of data resources to determine travel times, expected warehouse times, and expected sourcing times. Delivery schedules, unloading schedules, and product-node relationships are also taken into account. The data resources can include any of various resources that can provide insight into the lead time needed to move a product between nodes, and/or from a vendor to a node, in the supply chain 100. In the example of FIG. 4, the data resources include a route travel time calculator 320, delivery schedule times 330, a sourcing time calculator 340, unloading schedule times 350, a warehousing time calculator 360 and product-node relationship data 370.

The route travel time calculator 320 utilizes expected zip code travel times 322 and a preferred node designator 324.

The zip code travel calculator 322 is able to provide travel time estimates between any two zip codes. In certain examples, the travel time estimates are calculated according to known distances, topography, speeds and/or other factors that can affect travel time. The travel time estimates can be provided by a transportation system. In some embodiments, the expected zip code travel times 322 are stored in a database that is updated whenever new information about transit times become available. The database maintains transit time data based on zip code. In some embodiments, the expected zip code travel times 322 are accessed from the database through an exposed API.

In some examples, the transportation system utilizes estimates supplied via a service provider such as PC*MILER™. PC*MILER specializes in providing transportation time and cost estimates associated with a distance and a desired number of stops between a point of origin and a point of final destination.

The expected route travel time calculator 320 combines the zip codes of the nodes in the preferred product transfer path generated by the preferred node designator 324 with the data provided by the zip code travel calculator 322 to determine an estimated time of travel between each of the nodes in the preferred product transfer path. In some instances, carrier service level agreements (SLA) 326 are utilized to calculate expected route travel times. The carrier SLAs 326 provide information about promised transportation speeds that will be expected between particular zip codes.

The node-to-node travel time estimates generated by the expected route travel time calculator 320 are provided to the configured lead time generator 310. In certain examples, the data from the zip code travel calculator 322 and the preferred node designator 324 can additionally be supplied to the configured lead time generator 310. In certain examples, the data from the from zip code travel calculator 322 and the preferred node designator 324 are supplied to the configured lead time calculator 310 in place of the node-to-node travel time estimates provided by the expected route travel time calculator 320. The delivery schedule times 330 comprise the times of the day that a product transport vehicle is scheduled to be moving product from one node to another node in the supply chain 100. The delivery schedule time data can be provided to the lead time calculator 310 as static data based on pre-set transport schedules or can be provided in real time by monitoring movements of actual product transport vehicles.

The expected sourcing time calculator 340 determines the estimated amount of time required to manufacture, package, ship and deliver products to a node in the supply as measured from the receipt of a purchase order by a vendor. These estimates can be based on sourcing times of past purchase orders and/or on status notifications received during the sourcing process. The status notifications can include, for example, the date and time the vendor received and/or approved the purchase order, the date and time the manufacturing of the ordered product is complete, the date and time the product is packaged, the date and time the packaged product is placed with a carrier and the carriers travel time in reaching a receive center 104 of the supply chain 100. Other factors affecting sourcing time may also be considered. The estimated sourcing time is provided to the configured lead time calculator 310.

In certain examples, the estimated sourcing time can be overridden to reflect changes in standard sourcing procedures. For example, the vendor may deliver product to a flow center 106 and/or a retail store 108 rather than the receive center 104. The estimated sourcing time presumes delivery to the receive center 104 and, thus, delivery to a node other than a receive center 104 may shorten or lengthen the estimated sourcing time. This determined shortened or lengthened sourcing time can be provided to the lead time aggregator 310 as an override of the original estimated sourcing time.

The sourcing time calculator 340 can determine values based on information coming from multiple events and receipts. In the example shown in FIG. 4, the source time calculations 340 are calculated based on purchase order events 342, purchase order receipts 344, and carrier events 346. Purchase order events 342 are generated, for example, by the inventory management system 202 of FIG. 2. Purchase order receipts 344 are received from the vendors 102 at the inventory management system 202. The inventory management system 202 also processes carrier events 346 received from the transportation management system 206. The inventory management system 202 communicates these events and receipts to the lead time calculation system 205 through the lead time API 207.

In some embodiments, the expected sourcing time calculator 340 also utilizes vendor service level agreements (SLA) 348 to inform estimates for sourcing times. The vendor SLAs 348 provide information about agreements between the vendor and customer regarding delivery times, times to prepare orders, etc.

The unloading schedule times 350 comprise the times of the day and/or the amount of time that a product transport vehicle is scheduled to be at a node within the supply chain 100 for the purpose of unloading of products carried by the transport vehicle. The unloading schedule data can be provided to the lead time aggregator 310 as static data based on pre-set unloading schedules or can be provided in real time by monitoring the location of the product transport vehicle and the amount of time spent by the product transport vehicle at a node in the supply chain 100.

The warehousing time calculations 360 reflect the amount of time spent in moving product into and/or out of a node in the supply chain 100. The amount of warehousing time includes the time taken to handle the product at the node, e.g., the loading or unloading of product, the breakdown of product into smaller quantities, the packaging of product for transport, etc. The amount of warehousing time additionally includes the time needed to process all product entering or leaving the node, e.g. updating electronic inventory records to reflect the intake or removal of product from inventory. The amount of warehousing time further includes the time to place incoming product along a storage pick path enabling organized subsequent retrieval of the product and can also, or alternatively, include the time the to retrieve the product (e.g., via the storage pick path) for subsequent transport of product to another node in the supply chain 100. The warehousing times 360 are provided to the configured lead time calculator 310. In certain examples, the warehousing time estimates can comprise a static estimate or can comprise real time updates, for example, by electronically tracking the movement of each product or group of like products throughout the warehousing processes.

The warehousing time calculator 360 can calculate values based on multiple sources of information. In the example of FIG. 4 the warehousing time calculations 360 are calculated based on transfer order events 362, handling hours 364, processing hours 366, and route/pick path hours 368. Transfer order events 362 are received and processed from the transportation management system 206. Handling hours 364, processing hours 366, and route/pick path hours 368 are recorded at each warehouse. The hours can be recorded into a computing device manually or may be recorded automatically.

In certain examples, estimated warehousing times can be overridden to reflect changes in standard product warehousing procedures at a node. For example, a transfer order to move product from the current node to another node maybe received along with an instruction to delay transfer of the product for a specified time period. The delay in transfer of the product will include additional warehousing time that is not included in the original estimated warehousing time. As such, any shortening or lengthening of the estimated warehousing time can be provided to the lead time aggregator 210 as an override of the original estimated warehousing time for the transfer order.

The product-node relationship data 370 comprises data that identifies which products are located at which nodes, e.g. the in-stock inventory at the node. This data is provided to the configured lead time calculator 310.

The configured lead time calculator 310 takes in all data including the estimated time travel between nodes as provided by the route travel time calculator 320, product transport vehicle delivery schedules 330, calculated sourcing times (and/or overrides of sourcing times) 340, unloading schedules 350 of product transport vehicles, calculated warehousing times (and/or overrides of warehousing times) 360 and product-node relationships, to calculate an estimate of the total amount of lead time required to move a certain quantity of one or more types of products from a first node in the supply chain 100 to a second node in the supply chain 100 and/or to calculate an estimate of the total amount of lead time involved from placing a purchase order with a vendor to first receipt of the vendor product at a node within the supply chain 100. Note that a preferred node path for transport of product that includes more than two nodes can combine the lead times between each pair of nodes along the path to determine a lead time for the entire preferred node path.

As described above in connection with FIG. 2, a lead time API 207 external services to form queries and obtain lead time estimates from the configured lead time calculator 310 based on each of the estimates, schedules, and calculations based on that data. As noted above, the lead time API 207 can provide an interface to an external tool, for example to provide different lead time calculations based on preferred transportation routes, current and planned destination locations, and cost limitations. The API can also be accessed through a user interface accessible through a computing device, such as the computing device 220 of FIG. 2. Such information can be provided to the inventory management system 202, which can in turn compile current location information and item information to determine one or more shipment options and delivery dates for a particular item movement.

In some instances, for customer delivery, particular customers can be prioritized, allowing for faster (but likely more expensive) shipping options; in other instances, customer deliveries can be coordinated along store replenishment routes, thereby minimizing cost of shipping to the customer. Furthermore, via the API, the inventory management system 202 can calculate and determine likelihood of proper stock levels based on expected arrival times of items as determined by the lead time architecture. Other applications of lead time information accessible via the lead time API are possible as well.

Figure 5:
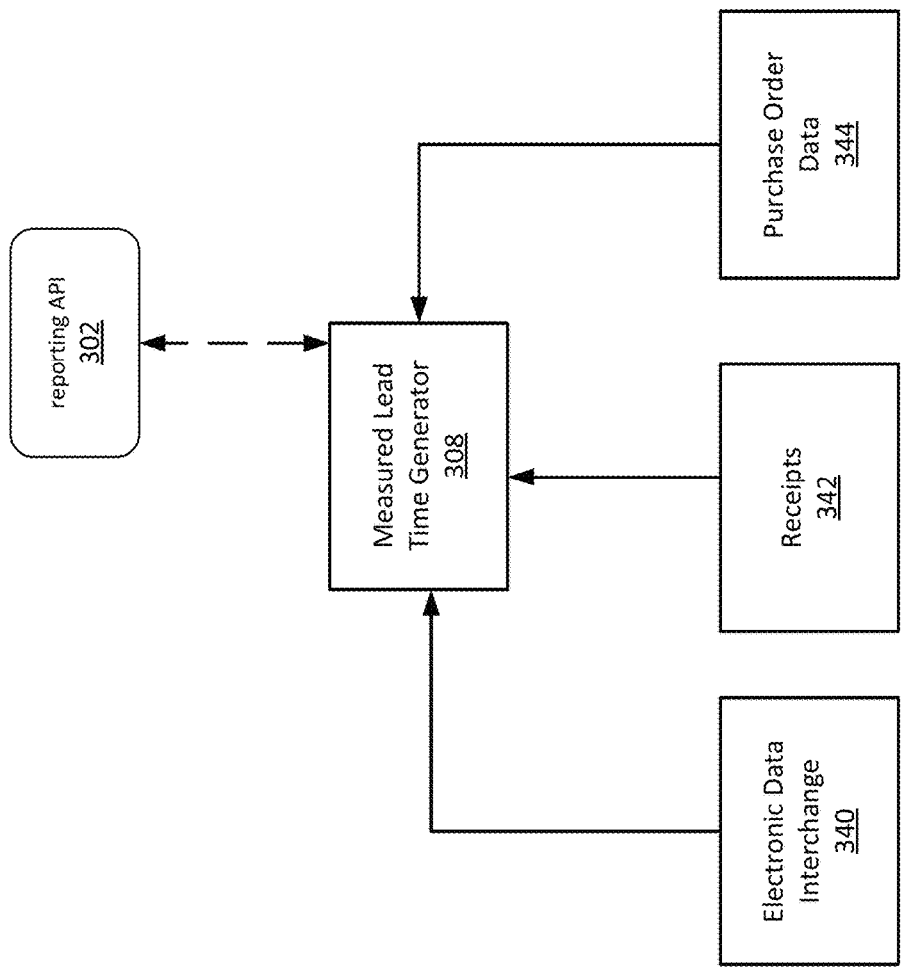
FIG. 5 illustrates a detailed schematic diagram of the measured lead time generator of FIG. 3.

FIG. 5 illustrates a detailed schematic diagram of the measured lead time generator 308. The measured lead time generator 308 is in communication with a reporting API 302. The measured lead time generator can output reports to the reporting API 302. The measured lead time generator 308 can also communicate through the lead time API 207 (not shown in FIG. 5).

The measured lead time generator 308 calculates actual lead times for transporting products from a source node to a destination node. The source node and destination node are defined by a purchase order which also specifies the products to be transported. In some instances, the purchase order also specifies a shipping method and speed. The measured lead time generator 308 receives data from the inventory management system 202 to calculate the actual lead times. This information comes from electronic data interchange (EDI) events 340, receipts 342, and purchase order data 344. This data can be processed from Kafka event streams.

Figure 6:
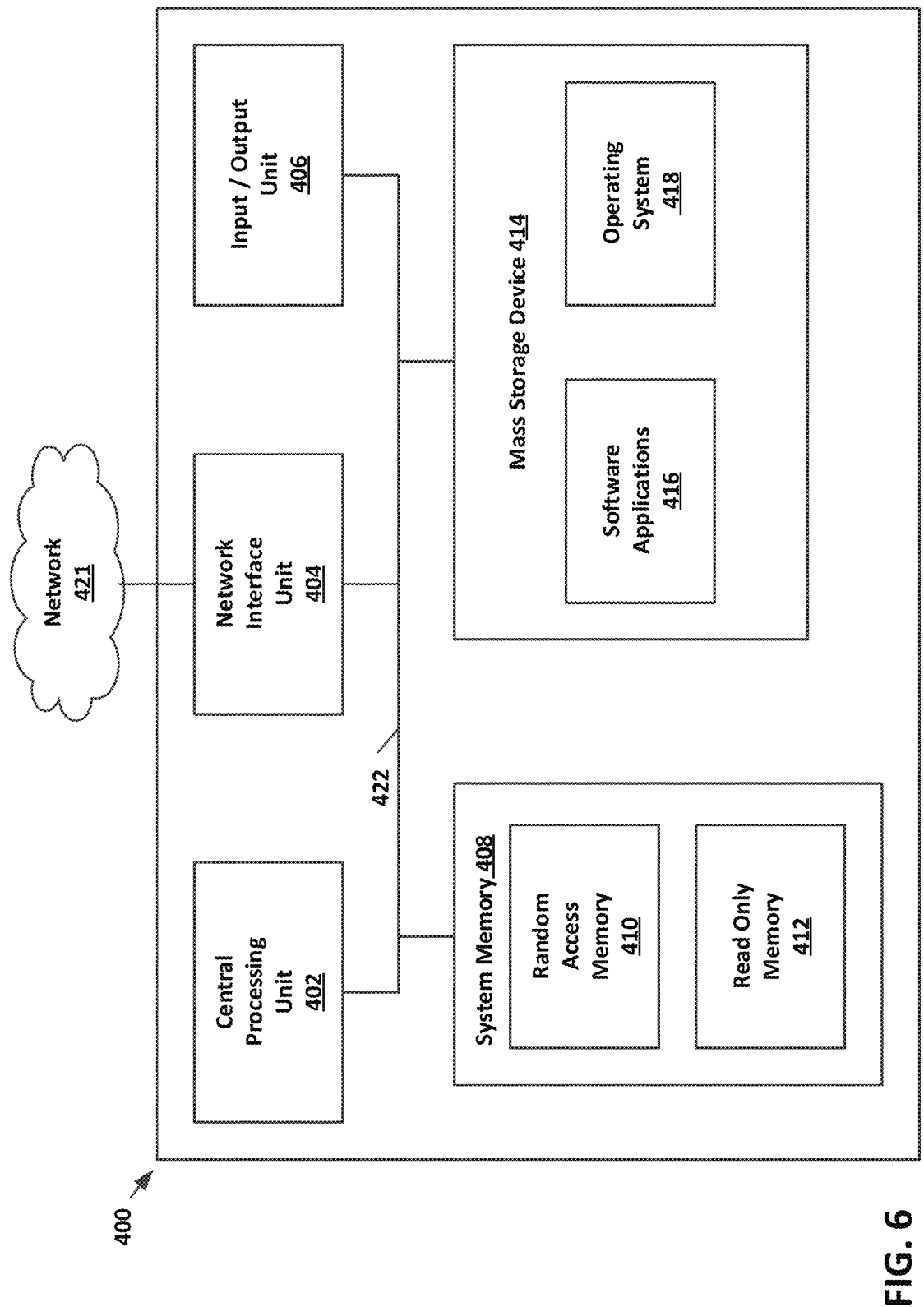
FIG. 6 illustrates a block diagram of an example computing device usable in the supply chain management system of FIG. 2.

Referring now to FIG. 6, an example block diagram of a computing device 400 is shown that is useable to implement aspects of the supply chain management system of FIG. 2. For example, the computing device 400 can be used to access the overall supply chain management system 200 as shown with the computing device 220 of FIG. 2.

In the embodiment shown, the computing device 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 is able to store software instructions and data such as those for executing the functions of the data aggregator 310 or data resources 320, 322, 324, 330, 340, 350, 360 and/or 370.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to various embodiments, the computing device 400 can operate in a networked environment using logical connections to remote network devices through a network 421, such as a wireless network, the Internet, or another type of network. The computing device 400 may connect to the network 421 through a network interface unit 404 connected to the system bus 422. It should be appreciated that the network interface unit 404 may also be utilized to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document. For example, the mass storage device 414 and/or the RAM 410 can store software instructions that, when executed by the CPU 402, cause the computing system 420 to receive and analyze inventory and demand data.

Figure 7:
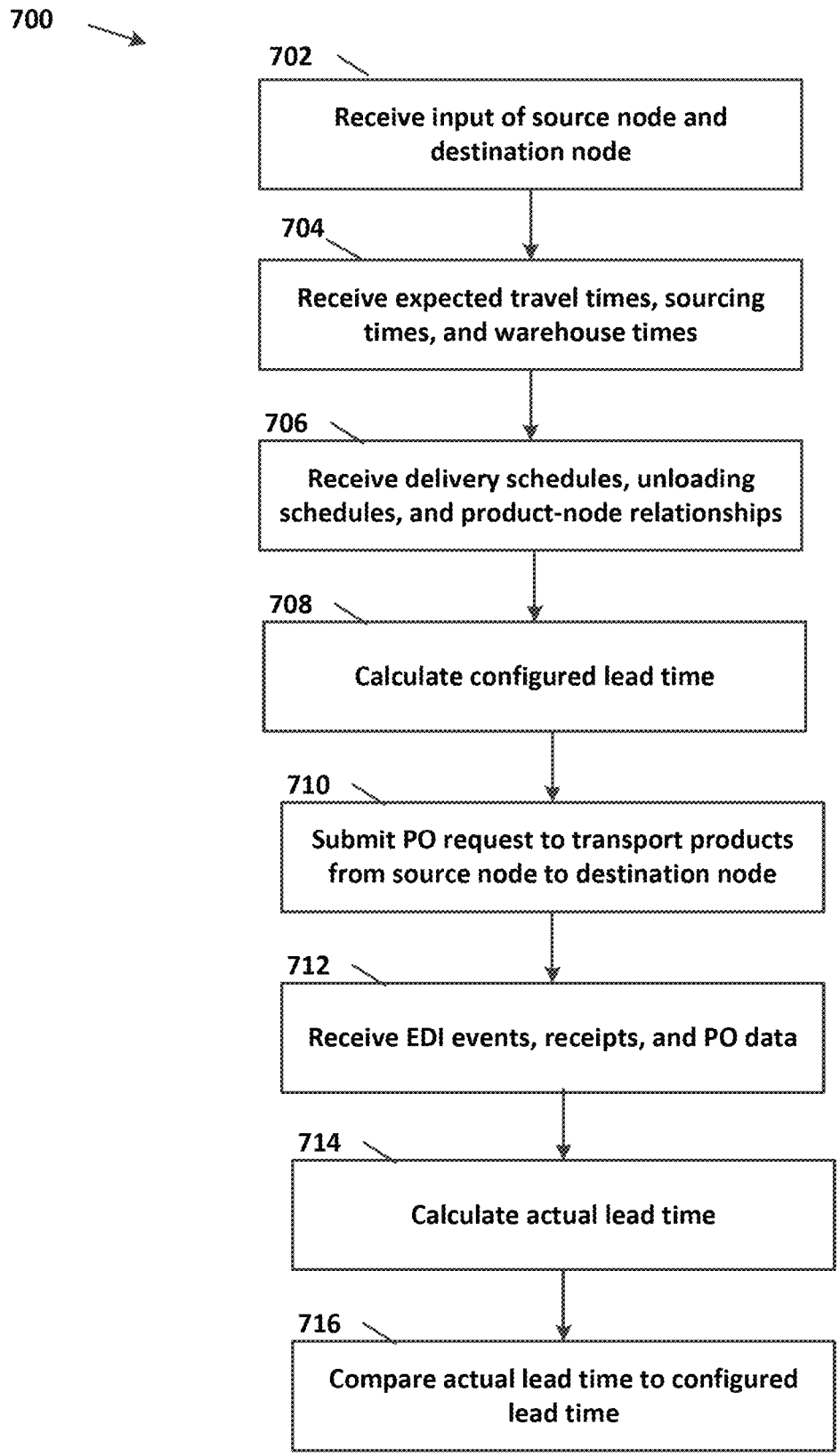
FIG. 7 is a flow chart of an example method of determining and comparing lead time calculations within the supply chain management system of FIGS. 2-5.
Figure 10:
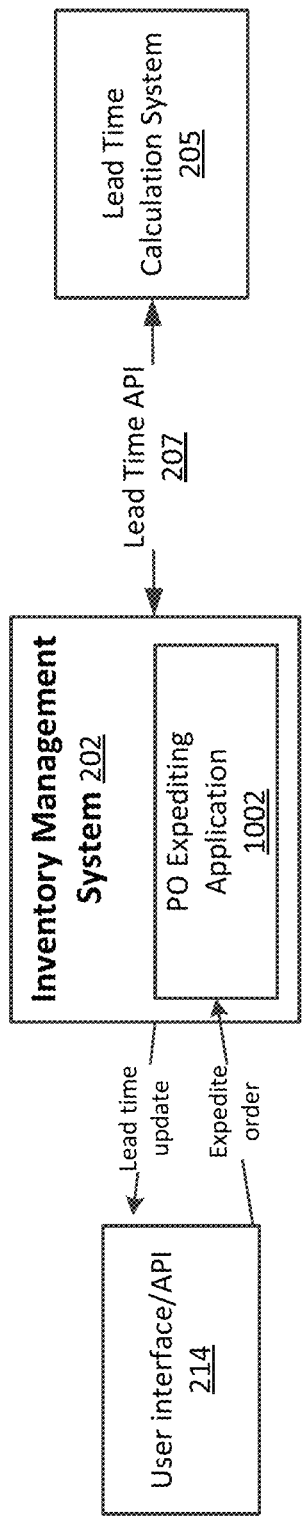
FIG. 10 illustrates a block diagram of an embodiment of the inventory management system of FIG. 2 including a purchase order expediting application.

Referring now to FIG. 7, an example method 700 of calculating and evaluating lead times is described. The example method 700 can be performed, for example, using the supply chain management system 200 described above.

In the embodiment shown, at 602, the method 600 includes receiving input of a source node and a destination node. This input can be received through the lead time API 207 from the transportation management system 202 or from inputs on a user interface. An example user interface is shown and described in FIGS. 9A-9B. In some embodiments, shipping preferences can be received at the same time.

At operation 704, expected travel times, expected sourcing times, and expected warehouse times are received. Travel times measure or estimate the amount of time that is takes to transport products from one node to another. Sourcing times measure or estimate the amount of time that it takes to source products from a vendor. Warehouse times measure or estimate the amount of time it takes to handle products at a warehouse node. Expected values can be calculated using machine learning based on historical values for each of the times. Alternatively, a human user can evaluate historical values for each of the times to determine estimates that are attainable for each measured time period.

At 706, delivery schedules, unloading schedules, and product-node relationships are received. Delivery schedules define the times that regular shipments will be made between nodes of the supply chain. Unloading schedules define times that particular warehouse nodes unload cargo from transport vehicles. Product-node relationships identify the products that are available at a given node.

At 708, configured lead times are calculated. The lead time calculator 205 ingests all of the relevant data to calculate an expected lead time between two different nodes. In some instances the configured lead times can be stored in a lead time database. The configured lead time is calculated based on the delivery schedules, unloading schedules, product-node relationships, expected warehouse times, expected travel times, and expecting sourcing times.

At 710, a purchase order request is submitted to transport products from the source node to the destination node. The purchase order request can include a shipping mode and speed. The request can be submitted, for example, through a lead time API 207 of the lead time architecture 300 of FIG. 3. The request is communicated to the transportation management system 202 for execution.

At 712, EDI events, receipts, and purchase order data are received from the transportation management system 202. The measured lead time generator 308 can receive the data through the lead time API 207. EDI events, receipts, and purchase order can be received from Kafka event streams.

In some embodiments, an EDI consumer receives purchase order event logs and a receipts consumer receives warehouse receipt logs. In some embodiments, the purchase order event logs and warehouse receipt logs are sourced from Kafka event streams. The purchase order event logs are received at the EDI consumer. The warehouse receipt logs are received at the receipts consumer. The events in the logs are processed into containers for each type of event. The events are then processed at an event processor.

At 714, an actual lead time is calculated by the measured lead time generator 308. The calculation is performed based on data extracted from the Kafka event streams in operation 712.

At operation 716, the actual lead time is compared to the configured lead time for transporting the products from the source node to the destination node. The comparison can then be presented on a user interface, such as the user interface/API 214. The comparison can also be submitted to a machine learning module for use in adjusting future expected lead times.

In general, the supply chain architecture described herein can use the lead time generated according to the process of FIG. 5 in a variety of ways. For example, the supply chain architecture can calculate times for transport of items between points in the supply chain, and to determine when an item will be available at the particular location. This information can be delivered to users or used in replenishment and/or order fulfillment planning purposes.

The lead time values generated by the lead time calculation system 205 can be utilized by various components of the supply chain management system 200. For example, the timing of inventory adjustments from the user interface/API 214 or proactive demand signals from the demand forecast engine 212 can be adjusted according to calculated lead times. Accurate lead times allow for leaner stocking of warehouses and other nodes. If the lead times for restocking a node are accurate, the inventory request can be made only when additional stock is needed and there is less lag time between the request being made and the inventory being positioned where it is needed. Proper timing of replenishment ensures that sufficient stock of desired items will be available at each node without overstocking items and spending unnecessary resources on storing such items.

FIG. 8 illustrates an example table 750 of values that are utilized to compare configured lead times with measured lead times. The purchase order ID 752 identifies the particular purchase order that is being measured and compared. The source node 754 is a number identifying the origin of one of more products. The destination node 756 is a number identifying the destination of the one or more products. The configured lead time 758 provides the total number of hours that it is expected to take to transport the products from the source node to the destination node. The configured lead time 758 is calculated using the configured lead time generator 306 of FIG. 3. The measured lead time 760 provides the total number of hours that it actually took to transport the products from the source node to the destination node. The measured lead time 760 is measured using the measured lead time generator 308 of FIG. 3. The over/under 762 provides a difference in time between the configured lead time and measured lead time. The calculations provided in this example table 750 can be generated using the method 700 as described in FIG. 7.

Sub-table 720 shows calculations for on-the-fly lead times for item 1 being transported from node 551 to node 1375. Three different lead time calculations are shown for different times of day. The total lead times depend on the lead time to trailer closure hours and transit time.

Other examples of data structures and tables are possible for calculating and storing lead time values. In some examples, such data structures are incorporated into the lead time data base 502 of FIG. 5

FIGS. 9A and 9B illustrate an example user interface 800 that can be employed on a computing device such as the computing device 220 of FIG. 2. FIG. 9A shows a view of the user interface 800 presenting node fields 804. Input is received as selections or text input in the node fields 804 that specifies a first node and a second node. The nodes specify the source location and destination location of a particular shipment or transfer of items. The ship date fields 808 receive input specifying a data for at least one of a ship begin date and a ship end date. In some instances, only one date can be entered and the other date will be generated by the system. Once the node fields 804 and at least one ship date field 808 is filled, a selection of the calculate button 810 can be received to initiate calculation of lead time options.

The view of the user interface 800 in FIG. 9B shows a summary 814 of the entered information for source node, destination node, and ship begin date. Lead time options 818 are also presented for the nodes and the selected date. Three shipping options are shown with three different arrival dates. In some embodiments, this information could be automatically output to other systems within the supply chain management system 200. In other embodiments, a selection of a desired lead time option can be received through the user interface 800 to put a purchase order into motion within the inventory management system 202. A purchase order request can be initiated that includes the options selected for the lead time calculation.

In some embodiments, the supply chain management system 200 includes a purchase order expediting application. The purchase order expediting application 1002 can be incorporated into the inventory management system 202 of FIG. 2.

Figure 11:
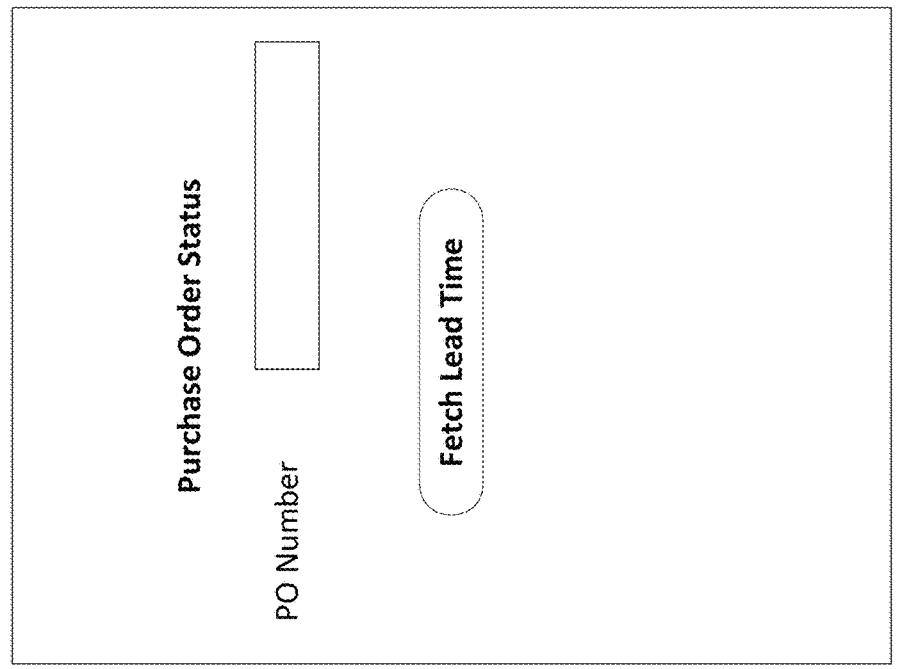
FIG. 11 is an example expediting user interface displaying a field for user input.

A user can access information about projected lead times of purchase order through the user interface/API 214. An example view of the user interface 1100 is shown in FIG. 11. In some embodiments, the user interface 1100 is incorporated into the same application as the user interface 800 of FIGS. 9A-9B. The user interface provides information to a user regarding the expected arrival date of one or more products to a destination node. To access this information, a user first enters a purchase order (PO) number into the PO number field 1102. Once a PO number has been input and a selection of the "fetch lead time" button 1104 is received, a command is issued through the purchase order expediting application 1002 to retrieve a current estimated lead time for the PO. The PO number is communicated through the Lead Time API 207 to the lead time calculation system 205.

Figure 12:
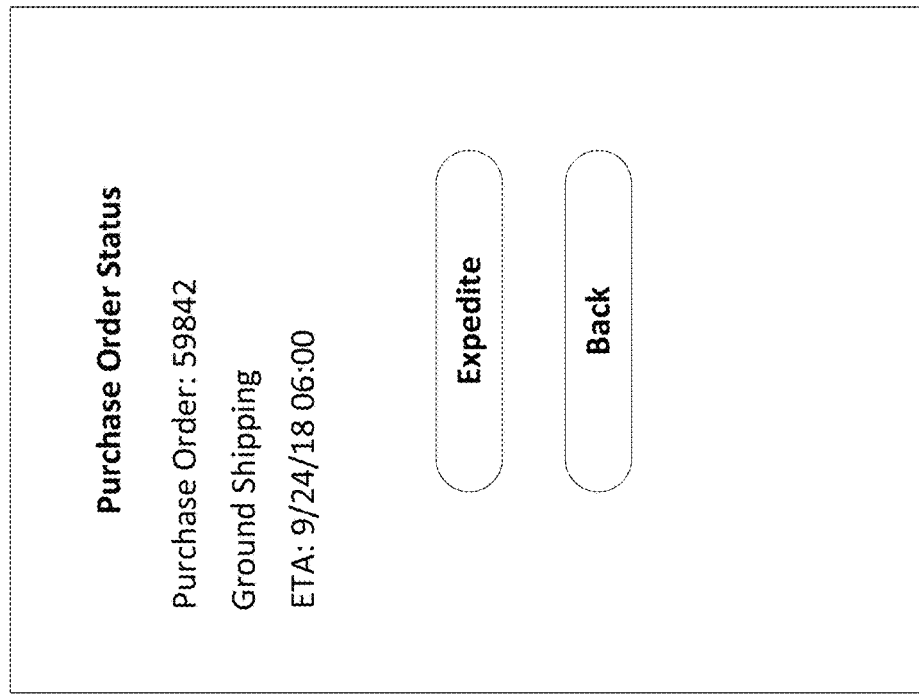
FIG. 12 is another view of the expediting user interface displaying summaries of lead time information.

The lead time for the PO can be calculated at the time of the request, as described above. Alternatively, the lead time can be accessed from the lead time database 304 of FIG. 3. The lead time and the currently selected transportation mode are displayed on the user interface 1100 in a status summary 1108 as shown in FIG. 12. In some embodiments, the lead time is represented by an estimated time of arrival at the destination node. The user interface 1100 displays an "expedite" button 1110 to view alternate transport options. Alternatively, selection of the "back" button 1112 returns the display on the user interface 1100 to the screen displayed in FIG. 11.

FIG. 13 displays the user interface 1100 after the "expedite" button 1110 was selected in the view of FIG. 12. A list 1108 of transport options and associated price differences is displayed with options to select a new, expedited mode of transport for the purchase order. Upon receiving input of a section and input of the "issue expedited routing request" button 1116, an expedited routing request will be issued by the purchase order expediting application 1002. Alternatively, selection of the "cancel" button 1118 will return the display to a previous screen and no expedited routing request will be issued for that purchase order.

The purchase order expediting application 1002 communicates the expediting routing request to the transportation management system 206, which relays the communication to the carrier that is handling the products in the purchase order. In some aspects, fewer than all of the items in a given PO can be selected for expediting.

This method of expediting PO's is an improvement over existing methods because previous PO expediting requests required manual entry into a computing system. This user interface 1100 allows for quick updates to currently pending PO's in order to ensure that items arrive to a destination node by a promised date and time.

It is noted that the lead time architecture described herein has a number of technical advantages over existing systems, particularly when used in the context of a supply chain management system. In particular, by aggregating lead times and providing a flexible lead time architecture, the system can coordinate order replenishment with knowledge about lead times, which leads to specific computational and physical item movement efficiencies. For example, accurate lead time calculations, available in real-time, allow for accurate, real-time replenishment decisions to be made with less computational complexity—e.g., requiring additional tracking accuracy of or a last calculation time of lead times associated with a particular route. Also, accurate, aggregated leadtimes and an exposed API providing access thereto allows each other portion of the supply chain management system to access lead times, allowing for integration with, e.g., a consumer website, to provide accurate real-time fulfillment estimates to customers directly. This can lead to more informed purchase decisions as well, due to the computational efficiencies apparent within the supply chain management system.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A lead time calculation system usable to estimate lead times for transporting product from a source node to a destination node within a supply chain, the system comprising:
   a configured lead time generator configured to:
      receive input of a source node and a destination node;
      receive an expected route travel time calculation, the calculation being based on machine learning analysis of historical route travel times between a zip code of the source node and a zip code of the destination node, the machine learning analysis comprising evaluating the historical route travel times to identify any outliers, evaluating one or more potential causes for the one or more outliers, and adjusting one or more parameters of the configured lead time generator;

receive a delivery schedule, the delivery schedule indicating a time of day that a product transport vehicle is scheduled to move product from the source node to the destination node;

receive an unloading schedule, the unloading schedule indicating the time of day that the product transport vehicle is scheduled to be at the destination node for the unloading of transported product;

receive an expected warehousing time calculation, the warehousing time calculation reflecting the projected amount of time spent in moving product out of the source node and the amount of time spent in moving the transported product into the destination node;

receive product-node relationship data that identifies which products are located at the source node; and calculate, using a machine learning module, a configured lead time estimate for moving product from the source node in the supply chain to the destination node in the supply chain based on the expected route travel time calculation, the received delivery schedule, the received unloading schedule, the received expected warehousing time, and the received product-node relationship data;

a measured lead time generator configured to:
receive input of a source node and a destination node;
receive electronic event log streams;
extract one or more of electronic data interchange (EDI) events, receipts, and purchase order data from the event log streams;
calculate an actual lead time for moving product from the source node in the supply chain to the destination node in the supply chain based on the EDI events, receipts, and purchase order data; and a lead time application programming interface (API) configured to:
receive a request for a lead time calculation comprising at least a source node and a destination node;
output the actual lead time and configured lead time to an inventory management system; and
output the actual lead time and configured lead time as feedback to the machine learning module of the configured lead time generator for use in adjusting future expected lead times.

2. The system of claim 1, wherein the request further identifies one or more shipping preferences.

3. The system of claim 1, wherein the inventory management system comprises a user interface configured to submit lead time requests and receive outputs of actual lead times and configured lead times.

4. The system of claim 1, wherein the inventory management system further comprises a purchase order expediting application configured to:
determine a current estimated lead time for a currently pending purchase order,
receive input at a graphical user interface to expedite the purchase order,
present, on the graphical user interface, one or more alternate transport options for the purchase order, and
upon receiving a selection of one of the alternate transport options, issuing an expedited routing request for the purchase order to a carrier that is handling the purchase order.

5. The system of claim 4, wherein the expedited routing request is for fewer than the total number of items in the purchase order.

6. The system of claim 1, wherein the source node comprises one of a vendor, a receive center, a flow center, or a store.

7. The system of claim 1, wherein the destination node comprises one of a receive center, a flow center, a store, or a customer location.

8. The system of claim 1, wherein the one or more alternate transport options include price differences.

9. The system of claim 1, wherein the lead time API is further configured to analyze trends in actual lead times to identify one or more nodes or shipping routes having a problem that needs to be addressed; and present information on a user interface about the one or more nodes or shipping routes that have been identified.

10. A computer-implemented method of evaluating an estimated lead time between a source node and a destination node of a supply chain, the method comprising:
receiving input of the source node and the destination node;
receiving an expected route travel time calculation, the calculation being based on machine learning analysis of historical route travel times between a zip code of the source node and a zip code of the destination node, wherein the machine learning analysis of historical route travel times is based at least in part on identification of one or more outliers, evaluating one or more potential causes for the one or more outliers, and adjusting one or more parameters of a configured lead time generator;
receiving an expected warehouse time calculation, the warehousing time calculation reflecting the projected amount of time spent in moving product out of the source node and the amount of time spent in moving the transported product into the destination node;
receiving delivery schedules and unloading schedules for the source node and the destination node, the delivery schedule indicating a time of day that a product transport vehicle is scheduled to move product from the source node to the destination node and the unloading schedule indicating the time of day that the product transport vehicle is scheduled to be at the destination node for the unloading of transported product;
receiving product-node relationship data that identifies which products are located at the source node;
estimating, at the configured lead time generator, a configured lead time for transporting products from the source node to the destination node, the estimating being performed using a machine learning module based on expected route travel time calculation, the received delivery schedules, the received unloading schedules, the received expected warehouse time calculation, and the received product-node relationship data;
submitting a purchase order request to transport products from the source node to the destination node;
receiving, from one or more event log streams, electronic data interchange (EDI) events, receipts, and purchase order data reflecting actual recorded travel times, sourcing times, and warehouse times for the purchase order;
calculating, at a measured lead time calculator, an actual lead time recorded for transporting products from the source node to the destination node based on the EDI events, receipts, and purchase order data;

comparing the actual lead time to the configured lead time; and submitting results of the comparing as feedback to the machine learning module for use in adjusting future expected lead times.

11. The method of claim 10, wherein the input of the source node and destination node are received from a transportation management system through a lead time API.

12. The method of claim 11, wherein the input is generated through a user interface displayed on a computing device.

13. The method of claim 11, wherein the expected travel times, expected sourcing times, and expected warehouse times are generated by machine learning.

14. The method of claim 11, wherein the expected travel times, expected sourcing times, and expected warehouse times are received from inputs to a user interface displayed on a computing device.

15. The method of claim 11, further comprising outputting the actual lead time and configured lead time to a user interface via an application programming interface.

16. The method of claim 11, further comprising outputting the configured lead time to an inventory management system via an application programming interface.

17. The method of claim 16, further comprising generating one or more transfer orders based on a replenishment plan generated at the inventory management system based at least in part on the configured lead time calculation.

18. The method of claim 10, further comprising:

receiving a request for a projected lead time for the purchase order;

presenting a current estimated lead time for the purchase order on a graphical user interface;

receiving input to expedite the purchase order;

presenting, on the graphical user interface, one or more alternate transport options for the purchase order; and upon receiving a selection of one of the alternate transport options, issuing an expedited routing request for the purchase order to a carrier that is handling the purchase order.

19. The method of claim 10, further comprising evaluating the results of the comparing to identify one or more nodes or shipping routes needing improvement.

* * * * *